(12) United States Patent
Schumann

(10) Patent No.: US 10,811,858 B2
(45) Date of Patent: Oct. 20, 2020

(54) DEAD-END SHOE APPARATUS AND METHODS OF USE THEREOF

(71) Applicant: Pole Line Innovations LLC, Abilene, TX (US)

(72) Inventor: Gary Schumann, Abilene, TX (US)

(73) Assignee: Pole Line Innovations LLC, Abilene, TX (US)

( * ) Notice: Subject to any disclaimer, the term of this patent is extended or adjusted under 35 U.S.C. 154(b) by 0 days.

(21) Appl. No.: 16/851,219

(22) Filed: Apr. 17, 2020

(65) Prior Publication Data

US 2020/0251833 A1    Aug. 6, 2020

Related U.S. Application Data

(63) Continuation-in-part of application No. 15/839,823, filed on Dec. 12, 2017, now Pat. No. 10,673,220.

(51) Int. Cl.

| | |
|---|---|
| *H02G 7/05* | (2006.01) |
| *H01R 4/30* | (2006.01) |
| *H02G 7/00* | (2006.01) |
| *H02G 1/00* | (2006.01) |
| *H02G 1/14* | (2006.01) |
| *H02G 1/02* | (2006.01) |
| *H01R 4/28* | (2006.01) |
| *H01R 11/32* | (2006.01) |
| *H01R 4/44* | (2006.01) |
| *H01R 4/64* | (2006.01) |
| *H01R 4/38* | (2006.01) |

(52) U.S. Cl.
CPC ............... *H02G 7/056* (2013.01); *H01R 4/28* (2013.01); *H01R 4/30* (2013.01); *H01R 4/38* (2013.01); *H01R 4/44* (2013.01); *H01R 4/646* (2013.01); *H01R 11/32* (2013.01); *H02G 1/00* (2013.01); *H02G 1/02* (2013.01); *H02G 1/14* (2013.01); *H02G 7/00* (2013.01); *H02G 7/05* (2013.01); *H02G 7/053* (2013.01)

(58) Field of Classification Search
CPC ............ H02G 7/056; H02G 1/02; H02G 7/14; H02G 1/04; H02G 7/02; H02G 7/20; H01R 4/44; H01R 43/00; H01R 43/002
See application file for complete search history.

(56) References Cited

U.S. PATENT DOCUMENTS

| 1,764,372 A | * | 6/1930 | Wahlberg | ............... | H02G 7/056 |
| | | | | | 24/135 A |
| 1,994,003 A | * | 3/1935 | Moore | ................... | H02G 7/056 |
| | | | | | 24/135 L |
| 2,062,653 A | * | 12/1936 | Hocher | .................. | H02G 7/056 |
| | | | | | 24/135 A |

(Continued)

*Primary Examiner* — Edwin A. Leon
*Assistant Examiner* — Matthew T Dzierzynski
(74) *Attorney, Agent, or Firm* — Carder Brooks

(57) ABSTRACT

An apparatus and method for enabling removable coupling of conducting lines in a powerline assembly is disclosed. In one embodiment, a dead-end shoe apparatus is disclosed that comprises a capping mechanism, coupling mechanism, and connection clamp, the connection clamp facilitating the removable coupling of conducting lines of variable diameters to the apparatus. In another embodiment, a method of selectively transmitting electricity in a powerline assembly is disclosed, wherein conducting lines are removably coupled to dead-end shoe apparatuses to facilitate the transmission.

20 Claims, 6 Drawing Sheets

(56) References Cited

U.S. PATENT DOCUMENTS

| | | | | |
|---|---|---|---|---|
| 2,429,705 A * | 10/1947 | Wadsworth | ............ | H02G 7/056 403/302 |
| 2,734,263 A * | 2/1956 | Bergan | ............ | H02G 7/056 29/433 |
| 3,238,290 A * | 3/1966 | Ruple | ............ | H01R 11/15 174/79 |
| 3,284,863 A * | 11/1966 | Lindsey | ............ | H02G 7/056 403/344 |
| 4,323,722 A * | 4/1982 | Winkelman | ............ | H02G 7/20 174/43 |
| 4,383,668 A * | 5/1983 | Hall | ............ | F16G 11/06 174/42 |
| 4,719,672 A * | 1/1988 | Apperson | ............ | G02B 6/48 24/135 R |
| 4,969,616 A * | 11/1990 | Apperson | ............ | H02G 7/056 24/135 N |
| 5,752,680 A * | 5/1998 | Mann | ............ | H02G 7/056 24/132 R |
| 7,535,132 B2 * | 5/2009 | Devine | ............ | H02G 1/04 307/147 |
| 7,562,848 B2 * | 7/2009 | Tamm | ............ | H02G 7/056 248/63 |
| 7,794,291 B2 * | 9/2010 | Goch | ............ | H01R 4/44 29/868 |
| 8,025,521 B2 * | 9/2011 | Diniz | ............ | H01R 4/2408 439/395 |
| 9,038,966 B2 * | 5/2015 | Bundren | ............ | H02G 7/056 248/63 |
| 9,520,704 B2 * | 12/2016 | Diop | ............ | H02G 7/056 |
| 9,577,354 B2 * | 2/2017 | Wolf | ............ | H01R 43/002 |
| 9,761,960 B2 * | 9/2017 | Tamm | ............ | H01R 43/00 |
| 9,825,449 B2 * | 11/2017 | Diop | ............ | H02G 7/056 |
| 10,673,220 B2 * | 6/2020 | Schumann | ............ | H01R 11/32 |

* cited by examiner

DEAD-END SHOE APPARATUS AND METHODS OF USE THEREOF

INCORPORATION BY REFERENCE TO ANY PRIORITY APPLICATION

Any and all applications for which a foreign or domestic priority claim is identified in the Application Data Sheet (either filed with the present application or subsequently amended) are hereby incorporated by reference under 37 CFR § 1.57. For clarity, U.S. patent application Ser. No. 15/839,823 is hereby incorporated by reference.

BACKGROUND

1. Field of the Invention

The present disclosure relates to a dead-end shoe apparatus and methods of use thereof that obviates the need for traditional tap connectors in an overhead powerline assembly.

2. Background of the Invention

Users of electrical power are often located great distances from the sources of electrical energy. Electricity generated by powerplants, hydroelectric dams, and the like is made available to end users through large, high-capacity, high-voltage, overhead powerline assemblies. These powerline assemblies generally consist of conductors suspended by towers or utility poles that allow for the dissemination of electrical current to consumers from a myriad of sources. When maintenance on these assemblies is required, linemen often perform the maintenance while suspended by a harness from the utility pole or tower; other times, a lifted bucket is used. At certain points throughout the overhead powerline assembly, the main conductor lines (tension-bearing or tensioned lines) are capped or terminated with metal devices known as dead-end shoes or dead-end shoe assemblies. Many different designs of dead-end shoes exist, but the ultimate purpose is the same: to terminate the conducting line. Generally, dead-end shoes cap or terminate the conductors and facilitate their attachment to insulators located on a tower or pole, effectively containing the current within that length of conducting line. This allows for easier maintenance of the overall powerline assembly, breaking the system and current up into multiple smaller and more manageable pieces. However, oftentimes, the current must still be transmitted from dead-ended main conductors to the next adjacent dead-ended main conductors to supply electricity further down the powerline assembly. This is accomplished through secondary conductors known as tap or jumper lines (non-tension-bearing or non-tensioned lines) that connect dead-ended conductor segments to one another, transmitting the current from an "energized" or "hot" conductor to a "de-energized" or "cold" conductor further downstream.

There are multiple types of connectors that facilitate linkage between the main conductor lines and the jumper lines, dubbed tap-connectors. These tap-connectors are generally completely separate devices from the dead-end shoes that cap or terminate the main conductors, and they are placed further back on the main conductor lines behind the dead-end shoe. Made of metal, the tap-connectors allow for the conduction of electrical current from an energized line to a de-energized line. Many of these tap-connectors have a similar problem of being very difficult or even impossible to remove from the main conductor or jumper once put into place. For example, H-tap connectors clamp two different cables together by bending the metal frame around each conducting line. While it is possible to remove the H-tap from each of the lines, it is difficult to do so; it requires unbending the metal frame of the connector. It is much easier and safer for the lineman to simply cut the conducting line behind the H-tap and splice in a new piece of line. Similarly, wedge-connectors create more-permanent connections that are difficult to undo. These connectors consist of a C-shaped metal component with grooves to accommodate two conducting cables. A metal wedge is then inserted, often with a powder cartridge, into the component between the two lines, effectively wedging the cables into the C-component grooves. Removing the wedge after it is inserted, while maybe possible, is time-consuming and arduous for the lineman performing the maintenance. This usually means that when maintenance of the powerline assembly requires the relocation or removal of either the jumper line, the tap-connector, or a part of the main conductor line, the easier and safer route for the lineman performing the maintenance is to simply clip the main conducting line behind the tap-connector; a new length of cable would then be spliced into the conducting line to obtain the length needed to reach the closest tower or pole.

The problem that different types of traditional tap-connectors pose to power line maintenance is two-fold: there is increased risk to linemen who perform maintenance on powerline assemblies, and the process demanded by such connectors is wasteful of materials and time. Linemen often work on powerline assemblies while suspended dozens of feet in the air. The less time they are suspended, the safer they ultimately are. Additionally, tap-connectors are separate and independent devices in the powerline assembly, yet another task in-and-of themselves for linemen to focus on. Because of the precarious position that linemen are in when performing maintenance, it is extremely important that they remain focused on safety procedures. One mistake and they could plummet to their death or touch an energized line by accident and electrocute themselves. That being the case, the less tasks they must juggle while suspended, the safer they are. Currently, tap-connectors are located behind dead-end shoes, requiring the lineman to reach out farther from his place of suspension to perform any type of maintenance that may be required at that point in the assembly, increasing the overall risk of accident. This risk is compounded if the lineman must attempt to remove the tap-connector from the main conductor or jumper line while suspended. As previously stated, the removal of tap-connectors is nigh impossible, and the more force that the lineman must exert while suspended increases his chance of falling or inadvertently touching an energized cable. Even if the tap-connector is clipped out of the main conductor, the lineman still must then splice a new piece of cable into the main conductor to enable it to reach the utility pole or tower, again increasing their suspension time and dividing their focus.

In addition to the safety issues associated with using traditional tap-connectors, the practice is also extremely wasteful of materials and time. The main conductor is usually clipped behind the tap-connector, and that entire clipped piece of cable is usually discarded. The jumper line itself is also usually discarded due to the difficulty of removing the tap-connector from either the main conductor or the tap conductor. As such, the tap-connector itself is also rarely, if ever, reused; it is discarded along with the rest of the removed components. Also, the process requires that a piece of cable be spliced into the main conductor, wasting time and keeping the lineman suspended for longer.

SUMMARY

In one embodiment, the present disclosure comprises a dead-end shoe apparatus comprising a capping mechanism configured to engage an end of a first conducting line; a coupling mechanism configured to secure the apparatus and first conducting line to a powerline assembly component; and a connection clamp. The connection clamp comprises a first clamp member comprising a first groove; a second clamp member comprising a first groove; and a tightening mechanism. The second clamp member can be configured to mobilize towards the first clamp member when the tightening mechanism is engaged. The first groove of the first clamp member and the first groove of the second clamp member can be configured to form a first cavity therebetween configured to receive a second conducting line. The connection clamp can be configured to removably couple the second conducting line to the apparatus, and the second conducting line can be a non-tension-bearing line.

In another embodiment, the present disclosure comprises a method of transmitting electrical current in a powerline assembly, comprising the steps of capping a first conducting line with a dead-end shoe apparatus; securing the apparatus to a powerline assembly component via the coupling mechanism of the apparatus; and removably coupling a second conducting line to the apparatus via the connection clamp. The dead-end shoe apparatus can comprise a capping mechanism; a coupling mechanism; and a connection clamp. The connection clamp can comprise a first clamp member comprising a first groove; a second clamp member comprising a first groove; and a tightening mechanism. The capping mechanism of the apparatus can be configured to cap an end of the first conducting line. The second clamp member can be configured to mobilize towards the first clamp member when the tightening mechanism is engaged. The first groove of the first clamp member and the first groove of the second clamp member can be configured to form a first cavity therebetween configured to receive the second conducting line, and the second conducting line can be a non-tension-bearing line.

The present disclosure offers advantages and benefits in the art by enabling the removable coupling of conducting lines in a powerline assembly. The apparatuses and methods of the present disclosure enable the conducting lines that are removably coupled to maintain their integrity. The present disclosure additionally enables the capping of conducting lines while simultaneously enabling the removable coupling of other conducting lines. The present disclosure additionally provides the advantage of transmitting electrical current from a capped conducting line to a second conducting line via a dead-end shoe apparatus.

DETAILED DESCRIPTION

The preferred version of the disclosure presented in the following written description and the various features and advantageous details thereof, are explained more fully with reference to the non-limiting examples included in the accompanying drawings and as detailed in the description, which follows. Descriptions of well-known components have been omitted so to not unnecessarily obscure the principle features described herein. The examples used in the following description are intended to facilitate an understanding of the ways in which the disclosure can be implemented and practiced. Accordingly, these examples should not be construed as limiting the scope of the claims. Specifically, any dimensions identified on any figures are preferred embodiments, and other embodiments can have different dimensions and capabilities, such that the dimensions should not be a limitation on the claims unless specifically recited therein.

In one embodiment, the present disclosure provides an apparatus and method for facilitating the removable coupling of lines in a powerline assembly to enable linemen to work more safely and efficiently. The apparatus and method can account for lines of variable size by facilitating the coupling of different sized lines. The apparatus and method for removable coupling can be configured to reduce the instance of accidental de-coupling, and can additionally be configured to preserve the integrity of the conducting lines that are coupled, such as by providing a clamp with rounded grooves that conform to the shape of the line.

The present disclosure provides at least the following benefits: 1) capping of current conducting lines in an overhead powerline assembly; 2) removable coupling of current conducting lines, preferably jumper lines, in a powerline assembly; 3) removable coupling of current conducting lines of variable size in a powerline assembly; 4) obviation of tap connectors in a powerline assembly; 5) preservation of conducting line integrity to enable multiple couplings and de-couplings using the same line; and 6) capping of conducting lines while enabling simultaneous, selective transmission of current from the capped lines.

Figure 1A:
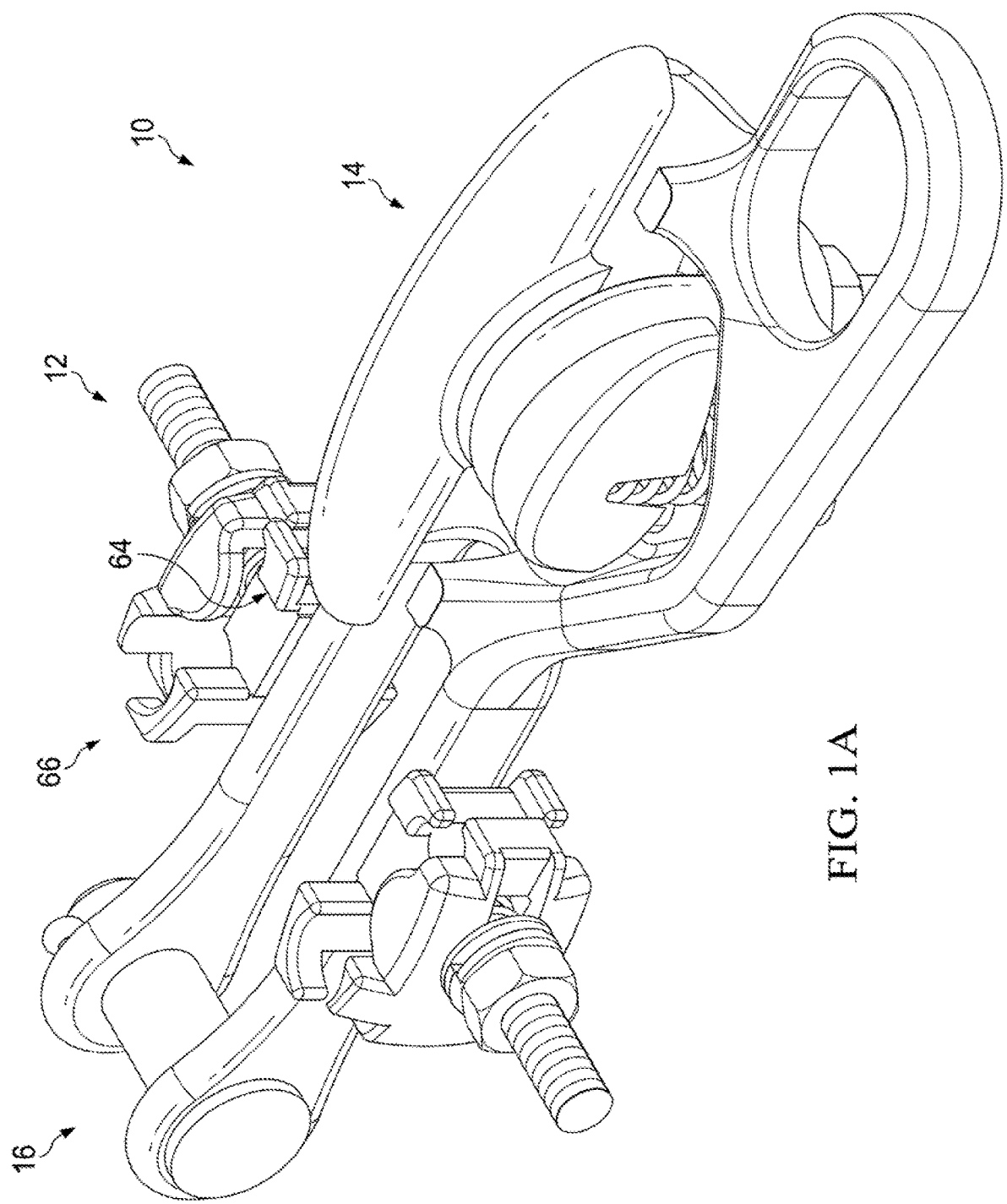
FIG. 1A shows a perspective view of a non-limiting embodiment of the present disclosure.
Figure 1B:
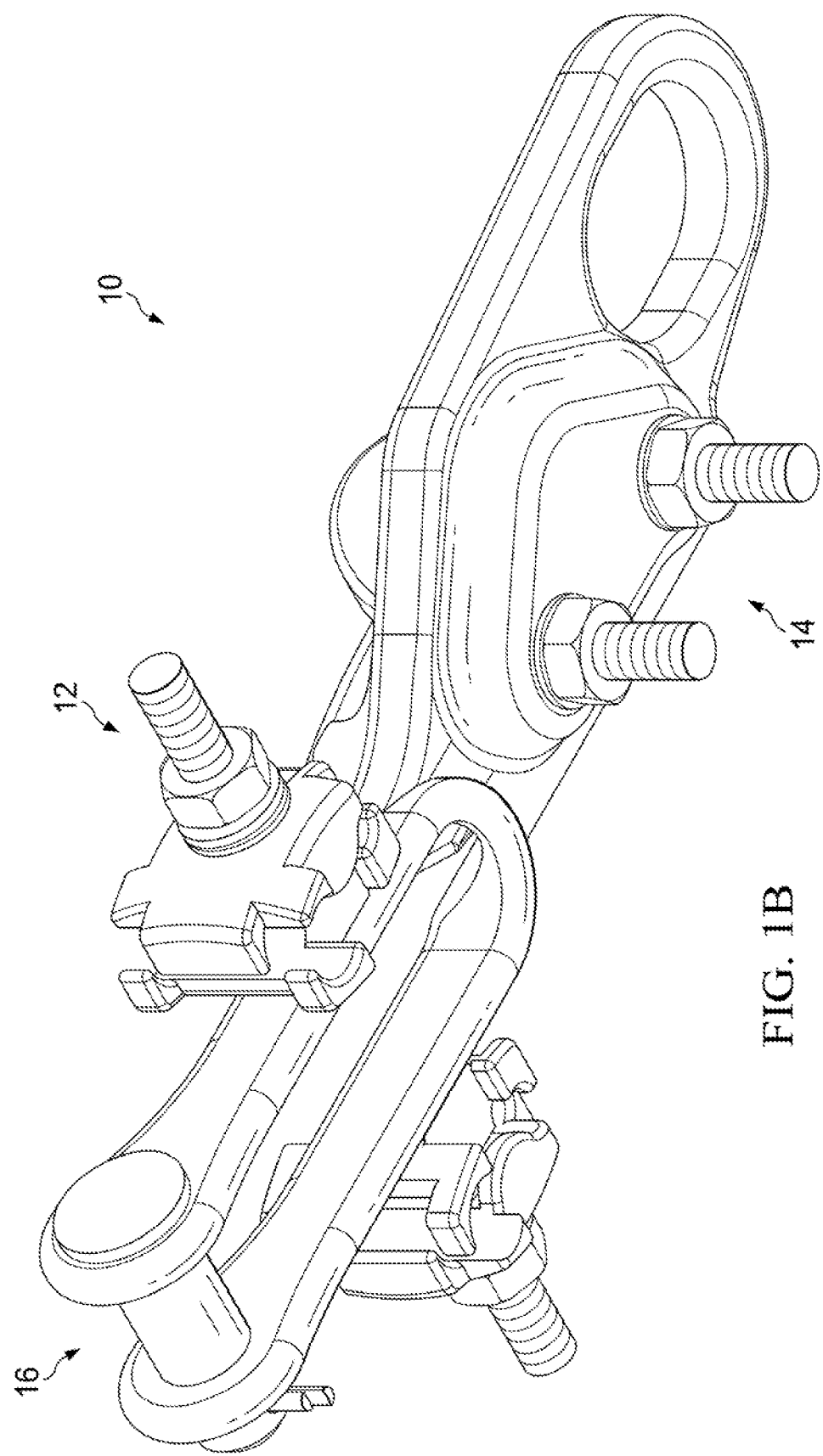
FIG. 1B shows a perspective view of a non-limiting embodiment of the present disclosure.

FIGS. 1A-1B depict a non-limiting embodiment of the present disclosure. A dead-end shoe apparatus 10 (made of a metal in one embodiment) is shown comprising a connector clamp 12; a capping mechanism 14 for capping a current conducting line; and a coupling mechanism 16 preferably configured to connect to insulating material, the coupling mechanism 16 shown here as an eyebolt. It should be understood that the capping mechanism 14 can comprise a clamping mechanism (as in a straight-line dead-end shoe), gripping unit (as in a clevis-type dead-end shoe), or any other suitable component for connecting to an end of an electric current conducting line, such capping mechanisms being known in the art, especially with respect to dead-end shoe designs. The coupling mechanism 16 for connecting the apparatus 10 to a powerline assembly component (e.g. insulating material, utility pole, conducting line, or any other suitable component that participates in a powerline assembly) can comprise an eyebolt, a clamp, or any other suitable component for attaching to a powerline assembly component; in one embodiment, the coupling mechanism 16 is configured to couple to insulating material that is secured to a utility pole, for example. In another embodiment, the coupling mechanism 16 can be configured to couple to another conducting line, such as with a clamp, gripping unit, or other suitable component.

It should be understood that the apparatus 10 can be configured to facilitate the securing of a current conducting line to a utility pole. For example, the capping mechanism 14 can be configured to cap a tension-bearing line in an overhead powerline assembly, and the coupling mechanism 16 can be configured to then connect the apparatus 10 (and capped tension-bearing line within the capping mechanism 14) to insulating material, such that the apparatus 10 is configured to cap a tension-bearing line and connect the tension-bearing line to a subsequent component in the powerline assembly, such as a utility pole or insulating material secured to a utility pole. As a non-limiting embodiment, the apparatus 10 can comprise multiple connection clamps 12 to facilitate connections to multiple conducting lines. In one embodiment, a connection clamp 12 can preserve the integrity of a conducting line that it engages; as a non-limiting example, the connection clamp 12 can comprise rounded grooves that conform to the shape of a conducting line. In another non-limiting embodiment, the connection clamp 12 can be configured to engage increased surface area of the line to spread out the instance of force applied to the line via the clamp, such as by increasing the depth of the clamp and grooves. This is advantageous in the art because, for example, if a screw were used to secure a stranded line (i.e. a line made of multiple small strands) directly to the body of the apparatus 10 instead of using such a clamping mechanism, the line could frayed, compromising the integrity of the line and increasing the potential for accidental decoupling of the line from the apparatus 10. A frayed line could additionally be useless with respect to future couplings. Similarly, a solid line (i.e. a line not made of small strands) could be deformed or scored by the screw if contacted directly by the screw, again compromising the integrity of the line, leading to line breakage.

Figure 2:
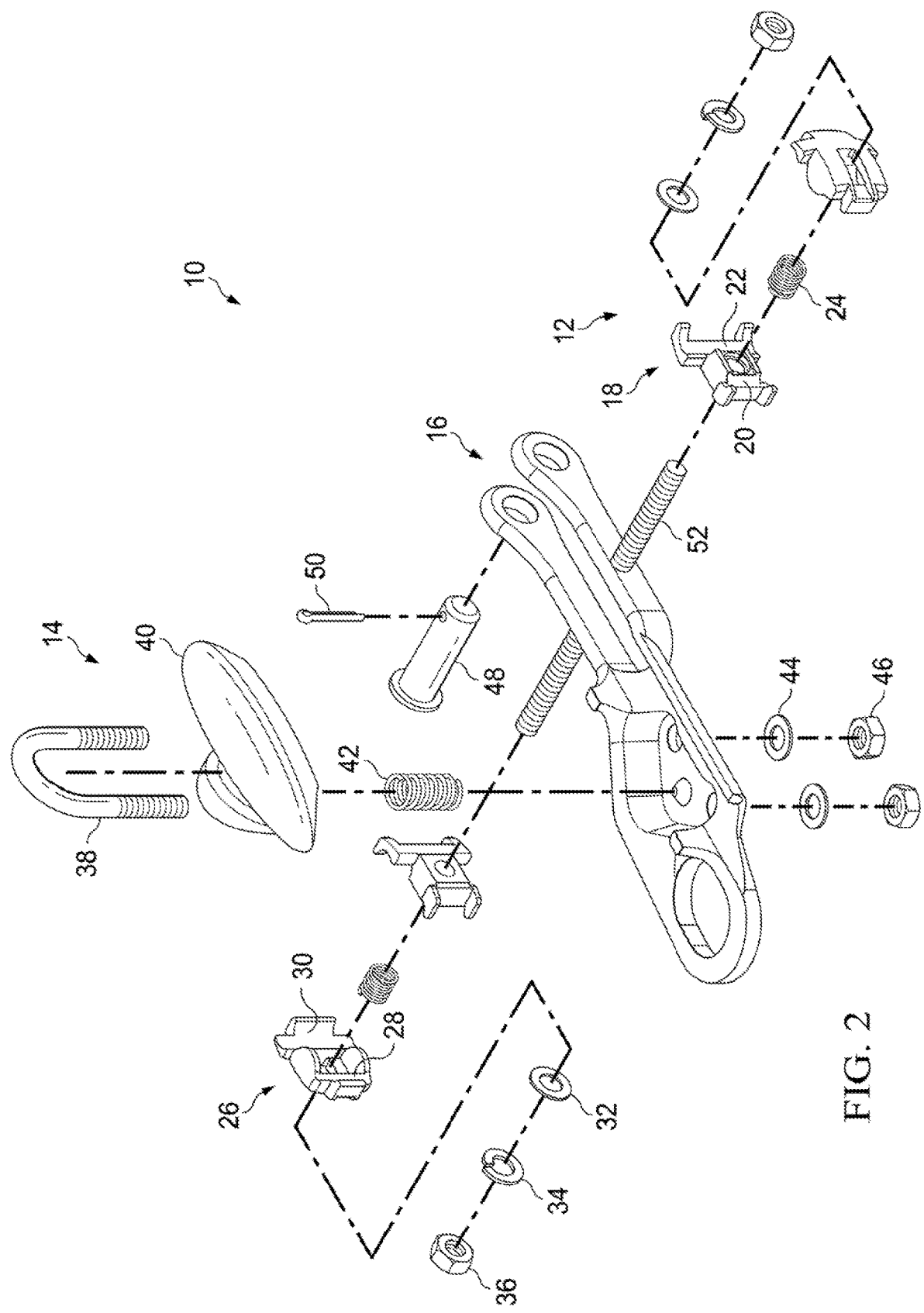
FIG. 2 depicts an expanded schematic of a non-limiting embodiment of the present disclosure.
Figure 3:
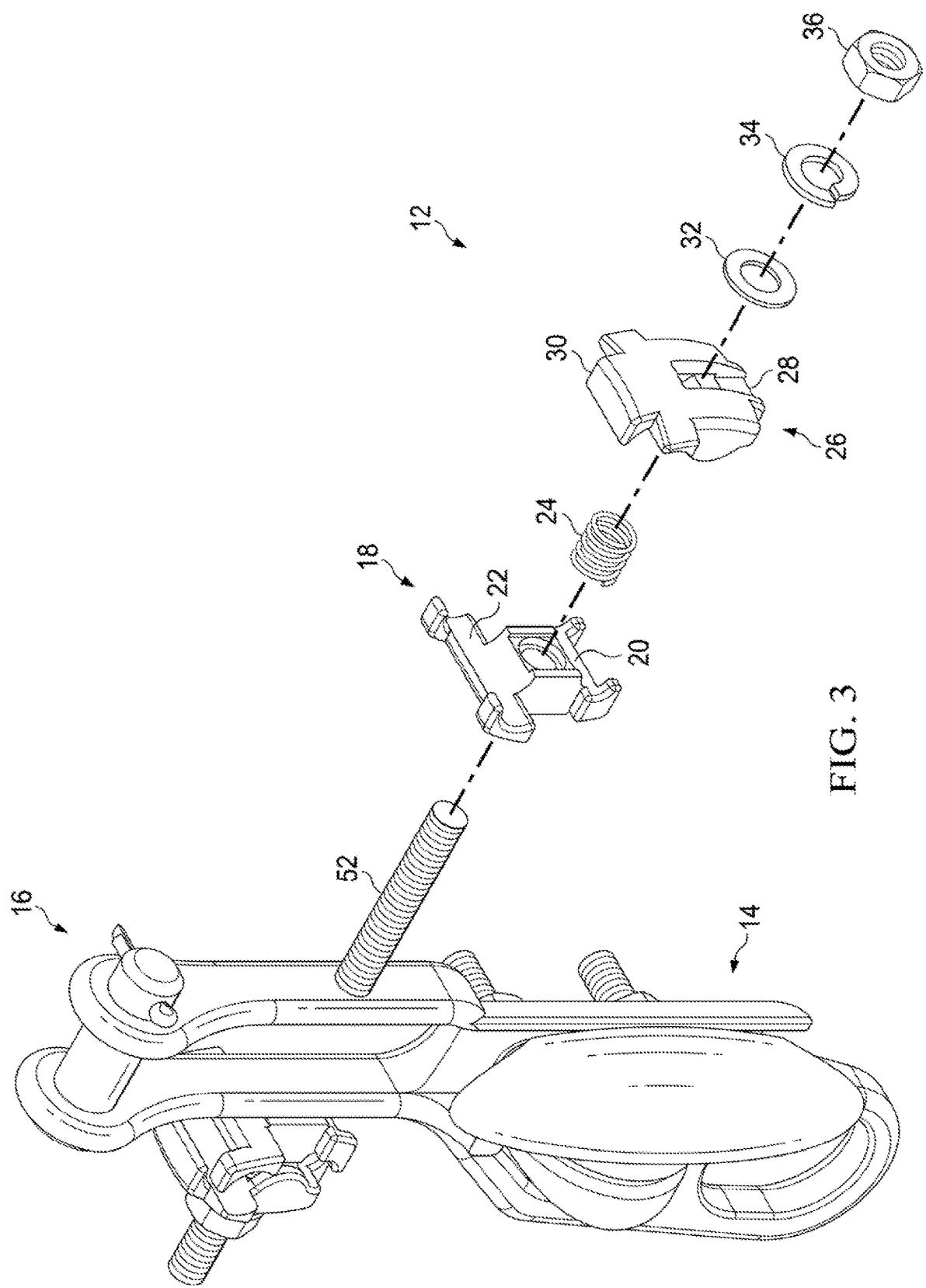
FIG. 3 shows an expanded schematic of a non-limiting embodiment of the present disclosure.

FIGS. 2-3 depict exploded views of an embodiment of the present disclosure, comprising a dead-end shoe apparatus 10 comprising a connector clamp 12 with a tightening mechanism. In one embodiment, the tightening mechanism can comprise a threaded rod 52 extending from a side of the apparatus 10, the threaded rod configured to enable installment of a connector clamp 12 and tightening of the connecter clamp via a nut 36. It should be understood that any other type of tightening mechanism can be used; for example, the connector clamp 12 can be a self-contained device affixed to the apparatus 10, comprising a tightening mechanism (as opposed to, in one embodiment, installing the connector clamp via a threaded rod 52 of the apparatus 10 and utilizing the threaded rod 52 to facilitate tightening of the connector clamp 12). Preferably, the tightening mechanism of the connector clamp 12 can be operated via a standard wrench head to facilitate universal operation by linemen, the advantages of such universal operation being apparent to those having skill in the art. It should be understood that the connector clamp 12 can be attached to the apparatus 10 by any suitable mechanism, such as welding, a bolt, a clip, a clamp, or a part of the connector clamp 12 can be extruded as part of the body of the apparatus 10 (for example, a first clamp member 18 can be extruded as part of the apparatus 10 body). In this embodiment, a first clamp member 18 and second clamp member 26 can be configured to engage the threaded rod 52. Preferably, the connector clamp 12 can be configured to receive two current conducting lines. More preferably, the connector clamp 12 can be configured to receive two current conducting lines that are different diameters (different gages).

In this non-limiting embodiment, the first clamp member 18 can comprise minor groove 20 and a major groove 22. A clamp spring 24 can be engaged with the threaded rod 52 between the first clamp member 18 and a second clamp member 26. The second clamp member 26 can also comprise a minor groove 28 and a major groove 30 configured to correspond to the minor groove 20 and major groove 22 of the first clamp member 18. The second clamp member 26 can be followed by a washer 32, a lock washer 34, and a nut 36 on the threaded rod 52, such that when the nut 36 is tightened on the rod 52, the second clamp member 26 can be mobilized towards the first clamp member 18, facilitating a clamping action between the grooves 20, 22 of the first clamp member 18 and the grooves 28, 30 of the second clamp member 26. In this manner, a minor cavity 64 is formed between the minor grooves 20, 28 and a major cavity 66 is formed between the major grooves 22, 30; it should be understood that a minor cavity 64 can be configured to receive a first conducting line and a major cavity 66 can be configured to receive a second conducting line, the first conducting line having a smaller diameter (small gage) as compared to the second conducting line. The minor and major grooves of the first and second clamp members 20, 22, 28, 30 can be configured to minimize disfigurement of the conducting lines that are removably engaged within the minor and major cavities 64, 66 of the connection clamp 12. In one embodiment, the grooves 20, 22, 28, 30 can be rounded to conform in shape to a conducting line. In another embodiment, the connection clamp 12 can be configured to rotate around the threaded rod 52 such that a conducting line engaged within the clamp 12 can couple to the apparatus 10 at the angle of least resistance.

The apparatus 10 can further comprise a capping mechanism 14. Preferably, and as a non-limiting embodiment, the capping mechanism 14 can be a clamp configured to receive an end of an electric current conducting line. The capping mechanism 14 can comprise a U-bolt 38 configured to engage a top member 40 and secure the top member 40 to the body of the apparatus 10. A spring 42 can be disposed between the top member 40 and the apparatus 10, and a set of washers 44 and nuts 46 can be configured to engage threaded ends of the U-bolt 40 to facilitate the tightening of the capping mechanism 14, such as to secure an end of an electric current conducting line within the capping mechanism 14. The apparatus 10 can further comprise a coupling mechanism 16 configured to facilitate attachment of the apparatus 10 to a component in an overhead powerline assembly. As a non-limiting embodiment, the coupling mechanism is shown here as an eyebolt assembly, wherein an eyebolt 48 can engage a set of holes (as well as a component disposed between the holes) on the apparatus 10 and be secured within the holes via a pin 50.

Figure 4:
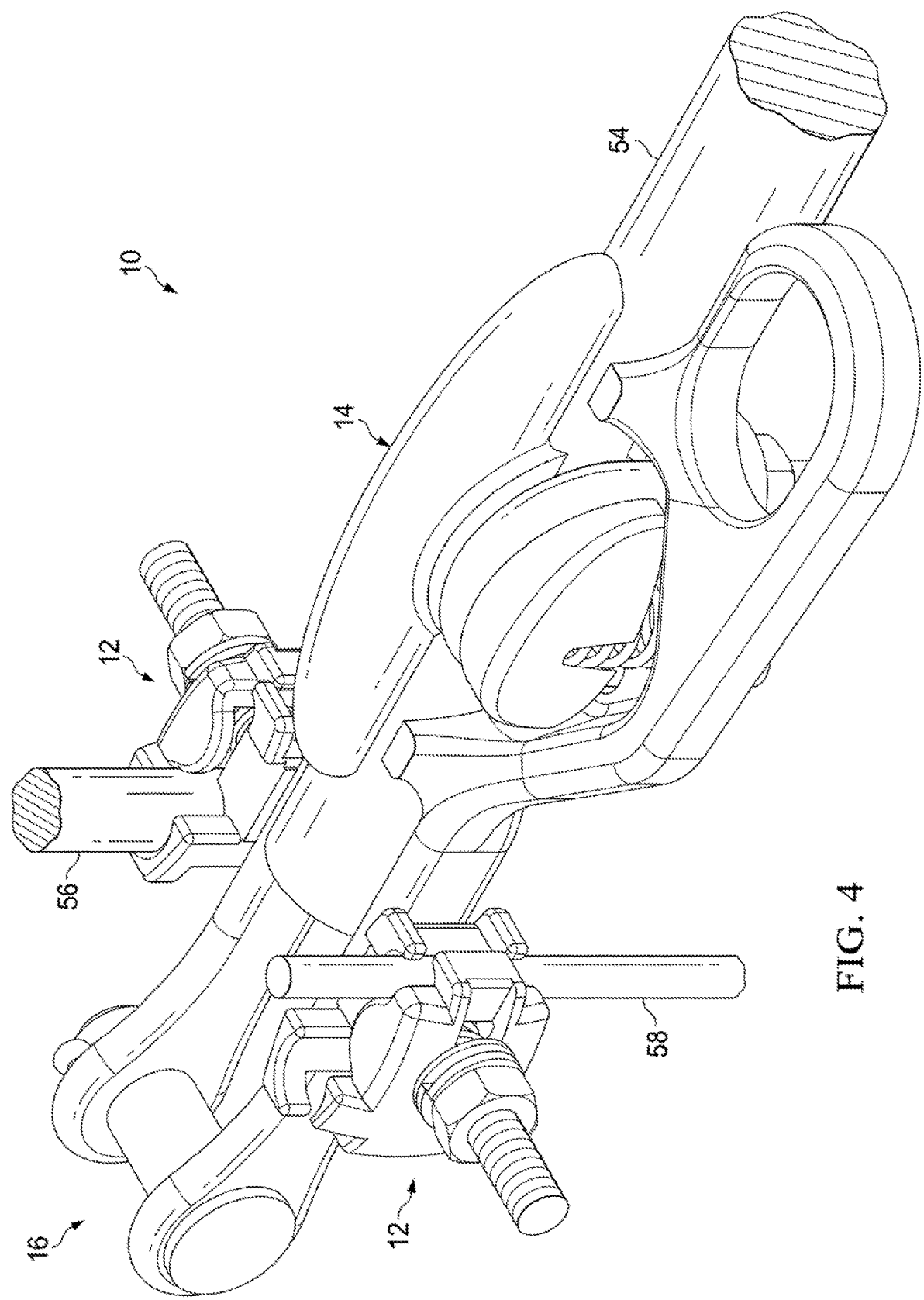
FIG. 4 depicts a perspective view of non-limiting embodiment of the present disclosure.

FIG. 4 depicts a non-limiting embodiment of the present disclosure. The apparatus 10 can engage multiple conducting lines 54, 56, 58 of different sizes. Preferably, and as a non-limiting embodiment, the end of a main conducting line 54 can be engaged within the capping mechanism 14. A second conducting line 56 can simultaneously be engaged within a major cavity of a connection clamp 12, and third conducting line (preferably having a smaller diameter than the second conducting line) can be engaged within a minor cavity of the same or different connection clamp 12. In one embodiment, the grooves and cavities of the connection clamp are configured to receive conducting lines in such a way that the integrity of the conducting lines are preserved as much as possible. For example, the grooves can be concave such that the curve of the conducting line is accommodated by the grooves. It should be understood that a connection clamp 12 enables the removable coupling of conducting lines to the apparatus 10. For example, the present disclosure comprises an apparatus 10 that facilitates connection of a tensioned overhead powerline to a utility pole; the capping mechanism 14 can be configured to receive a tensioned line, and the coupling mechanism 16 can be configured to facilitate connection to a utility pole, such as to insulating material secured to the utility pole. In this manner, the apparatus 10 can comprise a dead-end shoe capping a conducting line such that electric current can be contained within the tensioned line. While the apparatus 10 caps the tensioned line, a number of additional conducting lines may be removable coupled to the apparatus 10 via the connection clamp 12. In one embodiment, the apparatus 10 can comprise multiple connection clamps 12. The connection clamp 12 is configured to receive a conducting line, and the conducting line can be removably coupled to the apparatus 10 via the connection clamp 12 by tightening the nut 36 of the connection clamp 12; the conducting line can be removed from the connection clamp 12 by loosening the nut 36. In one embodiment, the connection clamp 12 comprises multiple cavities configured to receive conducting lines of different sizes. Preferably, the connection clamp 12 can comprise two cavities of different sizes, a minor (smaller) cavity 64 and a major (larger) 66 cavity. In one embodiment, the removable coupling of conducting lines within the connection clamp 12 can occur while the apparatus 10 caps a main conducting line 54 and secures the main line 54 to a utility pole.

Figure 5:
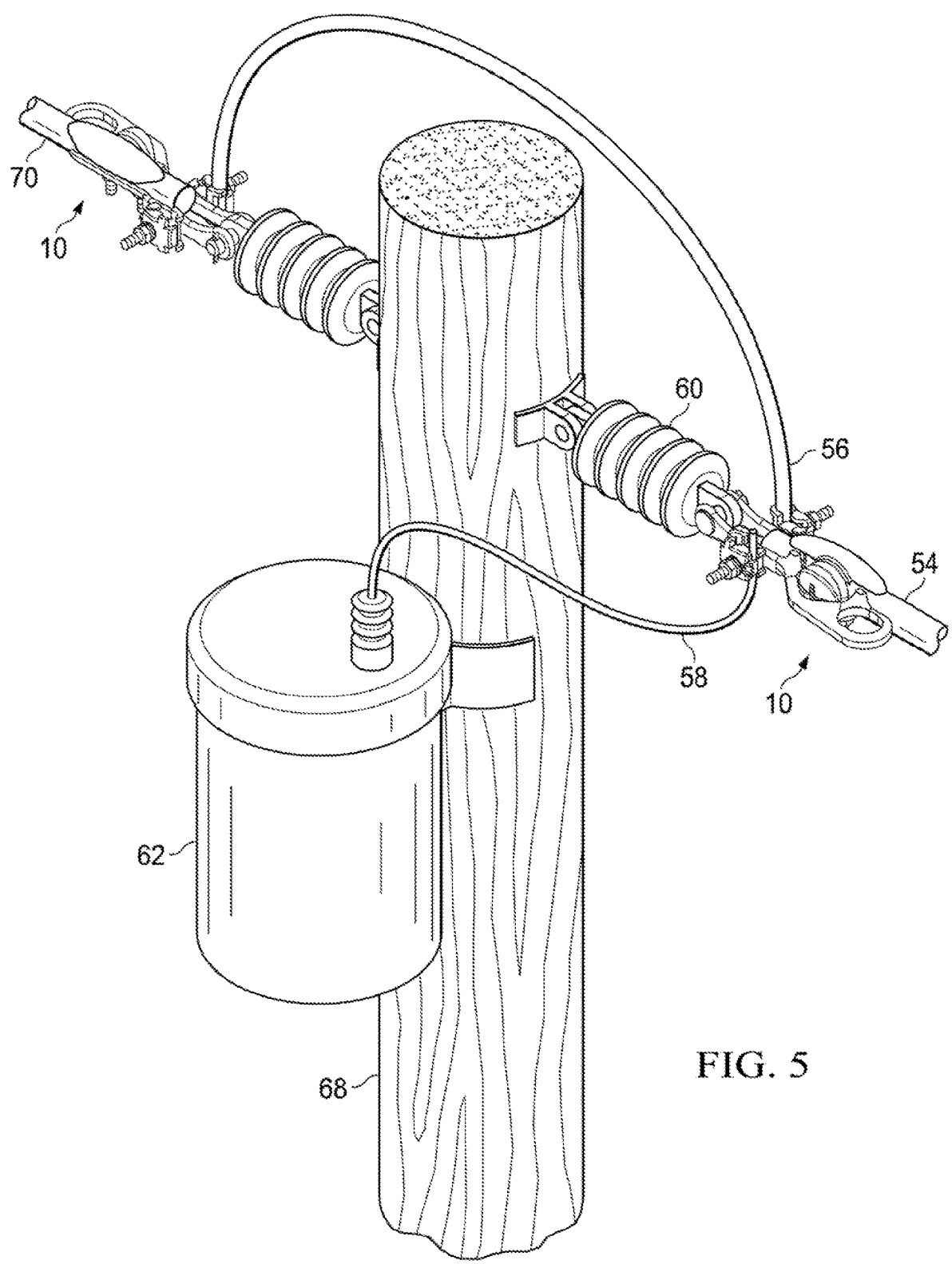
FIG. 5 depicts a perspective view of a non-limiting embodiment of the present disclosure.

FIG. 5 depicts a non-limiting embodiment of the present disclosure. A dead-end shoe apparatus 10 can cap a first tensioned main conducting line 54 and facilitate connection to, for example, insulating material 60 connected to a utility pole 68. The apparatus 10 can facilitate connection to a number of conducting lines 56, 58. In one embodiment, a thicker line 56 can be removably coupled to the apparatus 10 via a major cavity 66 (not labeled in FIG. 5) of a connection clamp (not labeled in FIG. 5), and a thinner line 58 can be removably coupled to the apparatus 10 via a minor cavity 64 (not labeled in FIG. 5) of a connection clamp (not labeled in FIG. 5). In one embodiment, the thinner line 58 can supply power to a device or machine 62, while the thicker line 56 transfers current from the main line 54 to a second tensioned main line 70 also connected to the utility pole 68. In one embodiment, the first and second main lines 54, 70 are each dead-ended into the utility pole via the apparatus 10 (one apparatus can cap one of each line 54, 70). In another embodiment, the conducting lines 56, 58 can be removed from the connection clamps while the apparatus 10 remains capping the tensioned lines 54, 70.

The present disclosure achieves at least the following advantages:
1. capping of current conducting lines in an overhead powerline assembly;
2. removable coupling of current conducting lines, preferably jumper lines, in a powerline assembly;
3. removable coupling of current conducting lines of variable size in a powerline assembly;
4. obviation of tap connectors in a powerline assembly;
5. preservation of conducting line integrity to enable multiple couplings and de-couplings using the same line; and
6. capping of conducting lines with simultaneous selective transmission of current from the capped lines.

Persons skilled in the art will readily understand that these advantages (as well as the advantages indicated in the summary) and objectives of this system would not be possible without the particular combination of structural components and mechanisms assembled in this inventive apparatus and described herein. The disclosure can be embodied in other specific forms without departing from the spirit or essential characteristics thereof. For example, each of the new structures described herein, can be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions are established by the appended claims rather than by the foregoing description. All changes that come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A dead-end shoe apparatus comprising:
   a capping mechanism configured to engage an end of a first conducting line;
   a coupling mechanism configured to secure the apparatus and first conducting line to a powerline assembly component; and
   a connection clamp comprising:
     a first clamp member comprising a first groove;
     a second clamp member comprising a first groove; and
     a tightening mechanism;
   wherein the second clamp member is configured to mobilize towards the first clamp member when the tightening mechanism is engaged;
   wherein the first groove of the first clamp member and the first groove of the second clamp member are configured to form a first cavity therebetween configured to receive a second conducting line;
   wherein the connection clamp is configured to removably couple the second conducting line to the apparatus; and
   wherein the second conducting line is a non-tension-bearing line.

2. The dead-end shoe apparatus of claim 1, wherein the first conducting line is a tension-bearing line.

3. The dead-end shoe apparatus of claim 1, wherein the powerline assembly component is insulating material.

4. The dead-end shoe apparatus of claim 1, wherein the tightening mechanism comprises a threaded rod and a nut rotationally engaged with the threaded rod, the threaded rod configured to receive the first and second clamp members.

5. The dead-end shoe apparatus of claim 1, the connection clamp further comprising a clamp spring disposed between the first and second clamp members.

6. The dead-end shoe apparatus of claim 1, wherein each of the first and second clamp members further comprise second grooves, the second groove of the first clamp member and the second groove of the second clamp member configured to form a second cavity therebetween configured to receive a third conducting line.

7. The dead-end shoe apparatus of claim 6, wherein the third conducting line is a non-tension-bearing line.

8. The dead-end shoe apparatus of claim 6, wherein the first grooves are minor grooves and second grooves are major grooves, wherein the first cavity is a minor cavity and the second cavity is a major cavity.

9. The dead-end shoe apparatus of claim 6, wherein the second conducting line and the third conducting line are different gages.

10. The dead-end shoe apparatus of claim 1, wherein the apparatus conducts electricity.

11. A method of transmitting electrical current in a powerline assembly, the method comprising the steps of:
capping a first conducting line with a dead-end shoe apparatus, the dead-end shoe apparatus comprising:
a capping mechanism;
a coupling mechanism; and
a connection clamp comprising:
a first clamp member comprising a first groove;
a second clamp member comprising a first groove; and
a tightening mechanism;
securing the apparatus to a powerline assembly component via the coupling mechanism of the apparatus; and
removably coupling a second conducting line to the apparatus via the connection clamp;
wherein the capping mechanism of the apparatus is configured to cap an end of the first conducting line;
wherein the second clamp member is configured to mobilize towards the first clamp member when the tightening mechanism is engaged;
wherein the first groove of the first clamp member and the first groove of the second clamp member are configured to form a first cavity therebetween configured to receive the second conducting line; and
wherein the second conducting line is a non-tension-bearing line.

12. The method of claim 11, wherein the first conducting line is a tension-bearing line.

13. The method of claim 11, wherein the powerline assembly component is insulating material.

14. The method of claim 11, wherein the tightening mechanism comprises a threaded rod and a nut rotationally engaged with the threaded rod, the threaded rod configured to receive the first and second clamp members.

15. The method of claim 11, the connection clamp further comprising a clamp spring disposed between the first and second clamp members.

16. The method of claim 11, wherein each of the first and second clamp members further comprise second grooves, the second groove of the first clamp member and the second groove of the second clamp member configured to form a second cavity therebetween configured to receive a third conducting line.

17. The method of claim 16, wherein the third conducting line is a non-tension-bearing line.

18. The method of claim 16, wherein the first grooves are minor grooves and second grooves are major grooves, wherein the first cavity is a minor cavity and the second cavity is a major cavity.

19. The method of claim 16, wherein the second conducting line and the third conducting line are different gages.

20. The method of claim 11, wherein the dead-end shoe apparatus conducts electricity.

* * * * *